US012608872B2

(12) United States Patent
Vijayaraghavan et al.

(10) Patent No.: US 12,608,872 B2
(45) Date of Patent: Apr. 21, 2026

(54) TECHNIQUES FOR MODEL-BASED IMAGE OPERATION IN EFFECT CREATION TOOLS

(71) Applicant: Lemon Inc., Grand Cayman (KY)

(72) Inventors: Lakshminarayanan Vijayaraghavan, San Jose, CA (US); Guoqiang Xie, San Jose, CA (US); Jason Yang, San Jose, CA (US); Blake Garrett Fuselier, Los Angeles, CA (US); Guan-Bai Chen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 102 days.

(21) Appl. No.: 18/448,622

(22) Filed: Aug. 11, 2023

(65) Prior Publication Data
US 2024/0404146 A1     Dec. 5, 2024

Related U.S. Application Data

(60) Provisional application No. 63/505,346, filed on May 31, 2023.

(51) Int. Cl.
| | |
|---|---|
| *G06T 11/60* | (2006.01) |
| *G06F 40/40* | (2020.01) |
| *G06Q 50/00* | (2012.01) |
| *G06T 5/77* | (2024.01) |
| *G06T 7/90* | (2017.01) |
| *G06T 15/04* | (2011.01) |

(Continued)

(52) U.S. Cl.
CPC ............. *G06T 15/04* (2013.01); *G06F 40/40* (2020.01); *G06Q 50/01* (2013.01); *G06T 5/77* (2024.01); *G06T 7/90* (2017.01); *G06T 11/60*

(2013.01); *G06T 15/503* (2013.01); *G06V 10/56* (2022.01); *G06T 2207/10024* (2013.01); *G06T 2207/30201* (2013.01)

(58) Field of Classification Search
CPC . G06T 15/04; G06T 7/90; G06T 11/60; G06F 40/40; G06V 10/56
See application file for complete search history.

(56) References Cited

U.S. PATENT DOCUMENTS

| | | | |
|---|---|---|---|
| 2009/0244071 A1 | 10/2009 | Kuo et al. | |
| 2015/0040074 A1* | 2/2015 | Hofmann | .............. G06T 19/006 |
| | | | 715/852 |
| 2017/0052937 A1* | 2/2017 | Sirven | ................. G06F 3/04845 |

(Continued)

FOREIGN PATENT DOCUMENTS

KR      10-2020-0092491 A      8/2020

OTHER PUBLICATIONS

International Search Report for PCT/SG2024/050355, mailed on Jul. 16, 2024, 4 pages.

(Continued)

*Primary Examiner* — Terrell M Robinson
(74) *Attorney, Agent, or Firm* — Astute IP Law Group

(57) ABSTRACT

Described are examples for image operations in an effect creation tool, including receiving, via a user interface provided for the effect creation tool, a natural language string requesting an operation related to obtaining or modifying an image, providing, to a model, an input including at least a portion of the natural language string, receiving, from the model, an image result output based on the input, and importing the image result as an asset in the effect creation tool.

20 Claims, 4 Drawing Sheets

(51) Int. Cl.
    *G06T 15/50*         (2011.01)
    *G06V 10/56*         (2022.01)

(56)             References Cited

U.S. PATENT DOCUMENTS

| | | |
|---|---|---|
| 2018/0075524 A1 | 3/2018 | Odizzio et al. |
| 2019/0004792 A1* | 1/2019 | Brebner .................. H04W 4/80 |
| 2019/0114748 A1* | 4/2019 | Lin ....................... G06N 3/0464 |
| 2020/0042286 A1* | 2/2020 | Bui ..................... G06F 3/04845 |
| 2020/0202579 A1 | 6/2020 | Caballero et al. |
| 2021/0037195 A1 | 2/2021 | Cutler et al. |
| 2021/0124562 A1* | 4/2021 | Kannan ............... G10L 15/1815 |
| 2022/0202168 A1 | 6/2022 | Troutman et al. |
| 2023/0126177 A1 | 4/2023 | Xu et al. |
| 2023/0148406 A1 | 5/2023 | Ganz et al. |
| 2024/0169622 A1 | 5/2024 | Xie et al. |

OTHER PUBLICATIONS

Non-Final Office Action for U.S. Appl. No. 18/354,546, mailed May 21, 2025, 16 pages.

\* cited by examiner

200

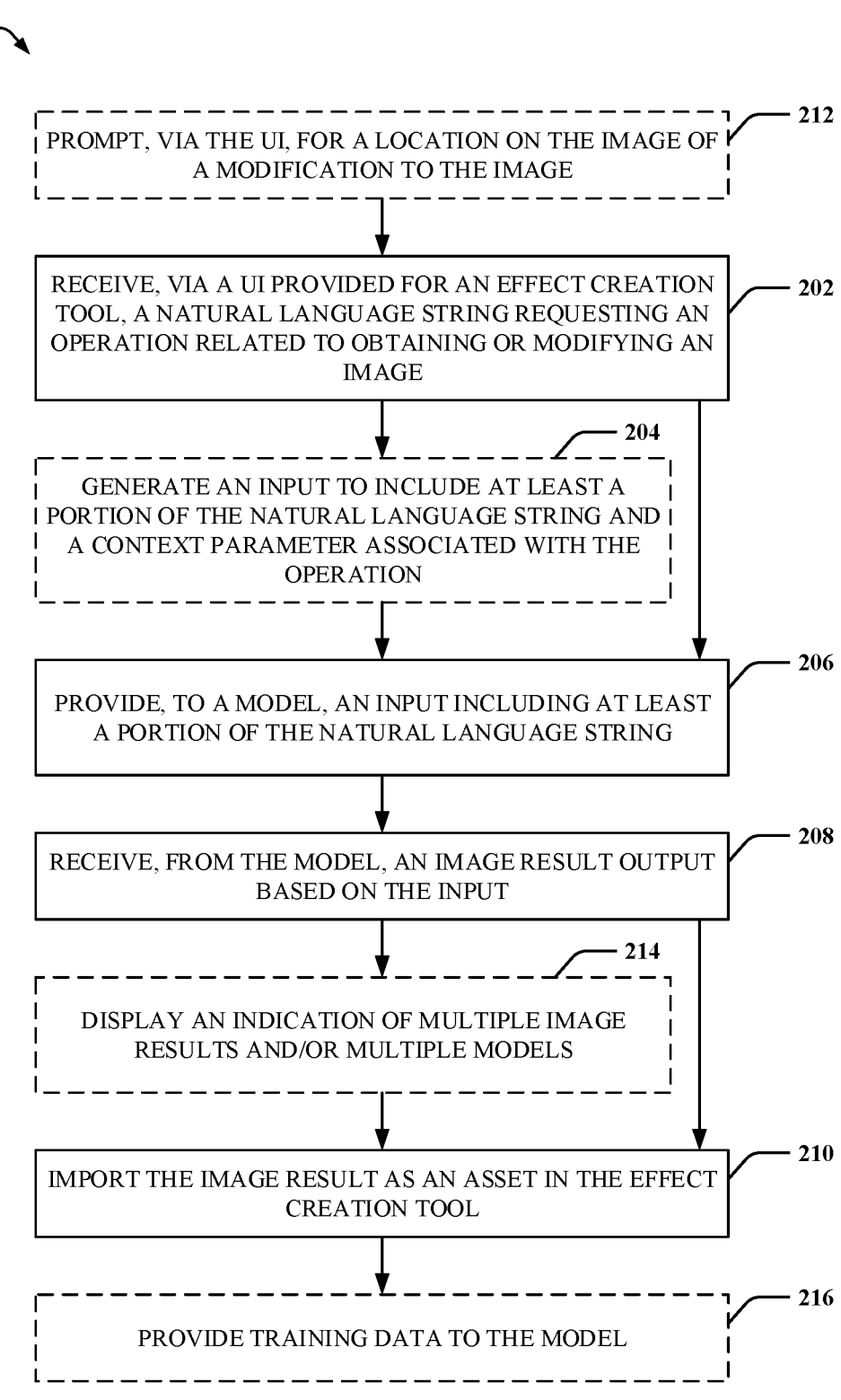

212 — PROMPT, VIA THE UI, FOR A LOCATION ON THE IMAGE OF A MODIFICATION TO THE IMAGE

202 — RECEIVE, VIA A UI PROVIDED FOR AN EFFECT CREATION TOOL, A NATURAL LANGUAGE STRING REQUESTING AN OPERATION RELATED TO OBTAINING OR MODIFYING AN IMAGE

204 — GENERATE AN INPUT TO INCLUDE AT LEAST A PORTION OF THE NATURAL LANGUAGE STRING AND A CONTEXT PARAMETER ASSOCIATED WITH THE OPERATION

206 — PROVIDE, TO A MODEL, AN INPUT INCLUDING AT LEAST A PORTION OF THE NATURAL LANGUAGE STRING

208 — RECEIVE, FROM THE MODEL, AN IMAGE RESULT OUTPUT BASED ON THE INPUT

214 — DISPLAY AN INDICATION OF MULTIPLE IMAGE RESULTS AND/OR MULTIPLE MODELS

210 — IMPORT THE IMAGE RESULT AS AN ASSET IN THE EFFECT CREATION TOOL

216 — PROVIDE TRAINING DATA TO THE MODEL

Figure 2

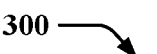
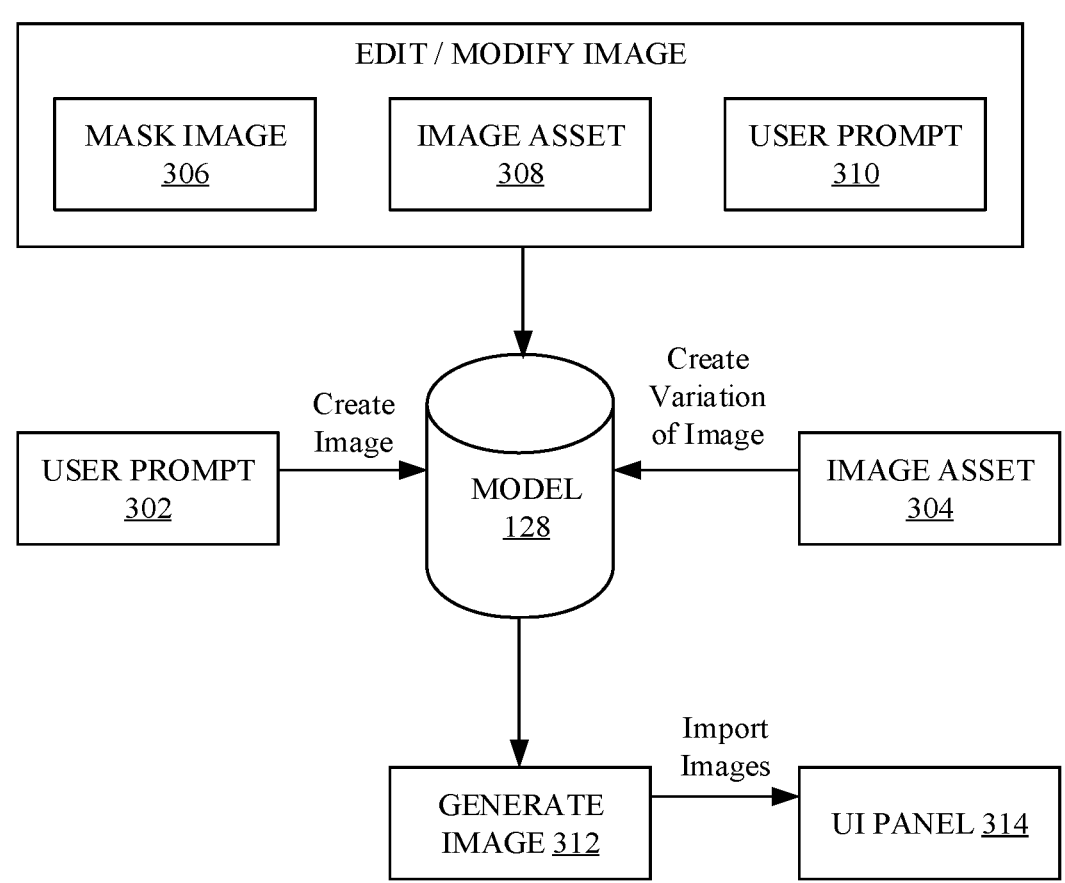
Figure 3

DEVICE 400

PROCESSOR(S) 402

MEMORY/MEMORIES 404

COMMUNICATIONS MODULE 406

DATA STORE 408

USER INTERFACE MODULE 410

EFFECT CREATION TOOL 110

TECHNIQUES FOR MODEL-BASED IMAGE OPERATION IN EFFECT CREATION TOOLS

CLAIM OF PRIORITY UNDER 35 U.S.C. § 119

The present Application for Patent claims priority to Provisional Patent Application No. 63/505,346, entitled "TECHNIQUES FOR MODEL-BASED IMAGE OPERATION IN EFFECT CREATION TOOLS" filed May 31, 2023, which is assigned to the assignee hereof and hereby expressly incorporated by reference herein for all purposes.

BACKGROUND

The described aspects relate to effect creation tools, and more particularly, performing image operations in the effect creation tools.

Game engines exist for simplifying creating of video games or other video-based applications or features by providing much of the video processing or presentation framework, along with tools to facilitate creation of the video games or other video-based applications or features using the framework. The tools can include effect creation tools, such as game engine-based tools, and can include a user interface or other mechanism allowing users to specify layouts, images, etc. to be included in creating the video applications, video effect, and/or corresponding features. The game engine-based tools can generate, based on interactions with the user interface, corresponding instructions that are of a syntax that the game engine can process. The game engine can accordingly generate corresponding video-based applications, video effects, or features based on the syntax generated by the tools.

Social media applications can also use game engines for certain functions. For example, a video capture and editing application can use game engines to display captured video, to display animations over displayed video (e.g., to display a facemask over a face that is the subject of the video), to allow interaction with the displayed video, etc. Importing images for using to create videos in the game engine-based tools require a user to locate and/or obtain the desired image, and provide a storage location from which to import the image. Users are limited to using images supported by the game engine-based tool or images that the user can locate or create using image editing software outside of the game engine-based tool. This can require additional knowledge of the user to locate the desired image, artistic ability of the user to generate or edit an image, and/or the like.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a computer-implemented method for image operations in an effect creation tool is provided that includes receiving, via a user interface provided for the effect creation tool, a natural language string requesting an operation related to obtaining or modifying an image, providing, to a model, an input including at least a portion of the natural language string, receiving, from the model, an image result output based on the input, and importing the image result as an asset in the effect creation tool.

In another example, an apparatus for image operations in an effect creation tool is provided that includes one or more processors and one or more non-transitory memories with instructions thereon. The instructions upon execution by the one or more processors, cause the one or more processors to receive, via a user interface provided for the effect creation tool, a natural language string requesting an operation related to obtaining or modifying an image, provide, to a model, an input including at least a portion of the natural language string, receive, from the model, an image result output based on the input, and import the image result as an asset in the effect creation tool.

In another example, one or more non-transitory computer-readable storage media are provided that store instructions that when executed by one or more processors cause the one or more processors to execute a method for image operations in an effect creation tool. The method includes receiving, via a user interface provided for the effect creation tool, a natural language string requesting an operation related to obtaining or modifying an image, providing, to a model, an input including at least a portion of the natural language string, receiving, from the model, an image result output based on the input, and importing the image result as an asset in the effect creation tool.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

BRIEF DESCRIPTION OF THE DRAWINGS

FIG. 2 is a flow diagram of an example of a method for using a model for performing image operations in an effect creation tool, in accordance with examples described herein.

FIG. 3 is a block diagram that illustrates an example of interactions with a model, in accordance with examples described herein.

DETAILED DESCRIPTION

Figure 1:
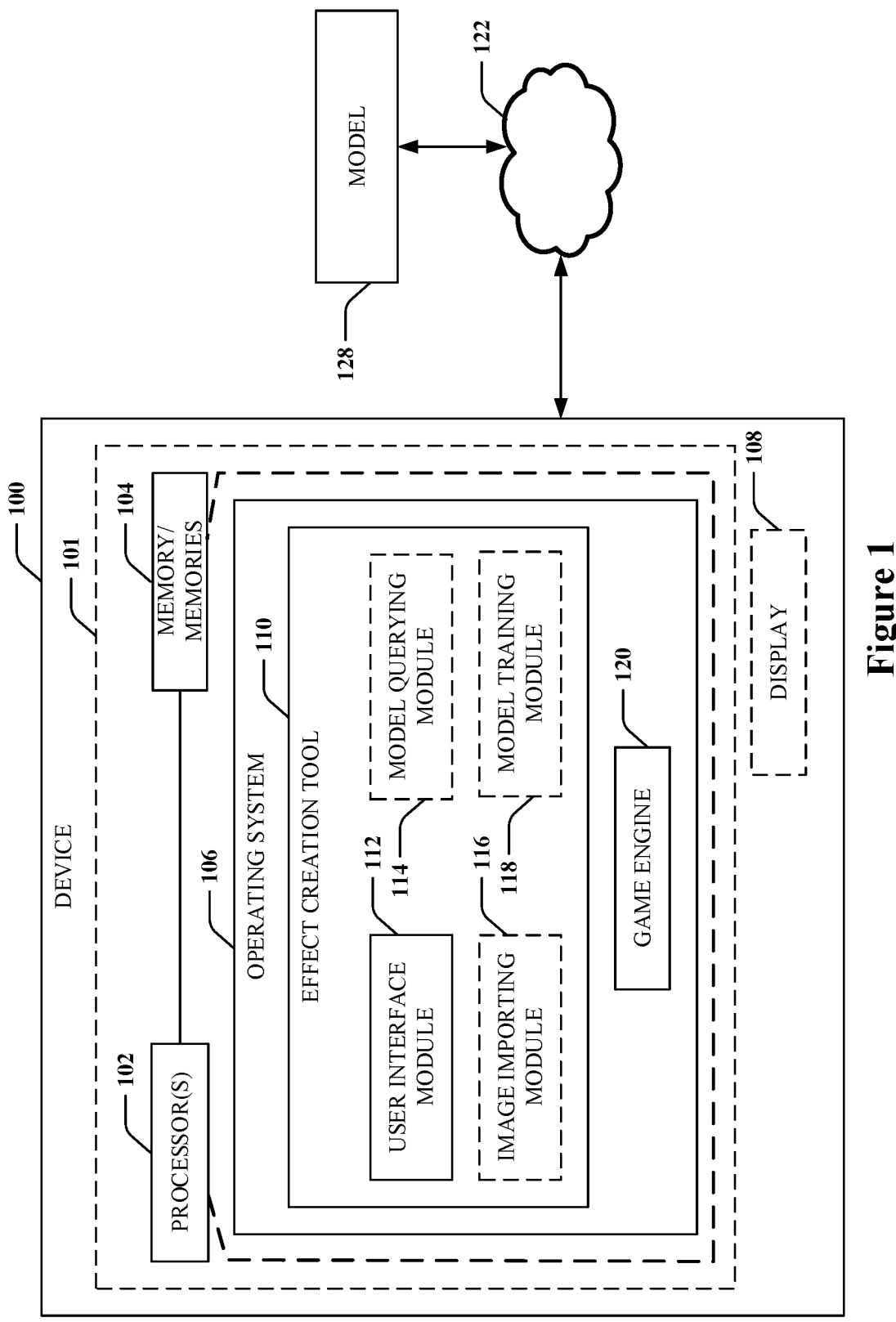
FIG. 1 is a schematic diagram of an example of a system for using a model in performing image processing in an effect creation tool, in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to using a model, such as an artificial intelligence (AI) or machine learning (ML) model, to assist in performing image operations in effect creation tools. An effect creation tool can include an application that allows for creating video applications (e.g., games, social media applications, etc.), visual effects or video effects for video applications or other applications, video features for video applications or other applications, augmented reality (AR) or virtual reality (VR) effects for video applications or other applications, etc. For example, an effect creation tool can be provided to operate with a game engine to allow for creating the video applications, visual effects, AR/VR effects, etc. for rendering using the game engine. As described, the game engine can provide a framework for video processing or presentation, and applications or tools (including an effect creation tool) can use the framework to create video applications, video effects, etc. using the game engine. In one example, effect creation tools can include game engine-based tools that are developed in conjunction with the game engine to provide a mechanism for creating videos or video effects using user interface commands. A game engine can provide a platform or framework for rendering video via a display device, where the game engine can include low-level instructions for rendering video via one or more processors (e.g., a central processing unit (CPU) and/or a graphics processing unit (GPU)), and can expose instructions or interfaces that other applications (e.g., game engine-based tools) can utilize to cause the game engine to render certain graphics or video.

In accordance with aspects described herein, models can be used to provide image results in an effect creation tool that are based on natural language requests input in the effect creation tool, e.g., via a user interface (UI), to allow for incorporating the image results in a video application, video effect, or other feature being developed using the effect creation tool. For example, the effect creation tool can include a UI that includes options for inputting natural language queries to achieve certain image-related operations. For example, the UI can include options at certain steps in creating a video application, video effect, or feature that allow for obtaining, editing, creating variations of, etc. an image using natural language requests or queries. The natural language requests can be provided to a model to obtain an image result, which the effect creation tool can import as part of a video application, video effect, or other feature being created.

Aspects described herein allow the effect creation tool to natively support querying models for image operations based on the natural language requests. In this regard, a user using the effect creation tool to create a video, video effect, or feature can easily obtain and/or import image results within the tool by using the natural language request and without requiring the user to download the image outside of the tool, import the image into the tool, modify the image to be compatible with the import process of the tool, etc. This can result in improved user experience when using the tool, and can allow users that may not be sophisticated in image processing to perform image operations using the natural language requests rather than having to know and use other processes in the tool to create, import, or modify images.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a system for using models in performing image processing in an effect creation tool, in accordance with aspects described herein. The system includes a device 100 (e.g., a computing device) that includes processors(s) 102 (e.g., one or more processors) and/or memory/memories 104 (e.g., one or more memories). In an example, device 100 can include processor(s) 102 and/or memory/memories 104 configured to execute or store instructions or other parameters related to providing an operating system 106, which can execute one or more applications, services, etc. The one or more applications, services, etc. may include an effect creation tool 110, which can be or include an application that facilitates creation of videos, applications that include videos (e.g., games), video effects, or other video features, where a game engine 120 (e.g., also executing via operating system 106) can render the videos to a display 108. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component 101), and/or the like. In other examples, processor(s) 102 can include multiple processors 102 of multiple devices 100, memory/memories 104 can include multiple memories 104 of multiple devices 100, etc. Memory/memories 104 may store instructions, parameters, data structures, etc., for use/execution by processor(s) 102 to perform functions described herein.

In addition, the device 100 can include substantially any device that can have a processor(s) 102 and memory/memories 104, such as a computer (e.g., workstation, server, personal computer, etc.), a personal device (e.g., cellular phone, such as a smart phone, tablet, etc.), a smart device, such as a smart television, and/or the like. Moreover, in an example, various components or modules of the device 100 may be within a single device, as shown, or distributed to different devices that are communicatively coupled with one another (e.g., in a network).

Effect creation tool 110 can include a user interface module 112 for generating user interfaces for outputting to a display 108 of the device 100 (or a display of another device). For example, user interface module 112 can accept input interactions on a displayed user interface from a user for creating videos, applications that include videos (e.g., games), or other video features (e.g., effects for videos), etc., as described herein. For example, the interactions may include selection of an image or video or effect for display, modification of the image or video or effect, such as to add effects, modify a portion of the image or video, overlay additional images, etc. In addition, user interface module 112 can output to the display 108 of the device 100, such as output the video being created, output a menu with inter-actable options for creating the video, such as a preview of an image or video, a list of images or videos to import, etc. In addition, in an example, effect creation tool 110 can optionally include a model querying module 114 for querying a model for obtaining image results from natural language requests, an image importing module 116 for importing the image results to the effect creation tool 110 (e.g., in a current project for creating an image or video or effect, etc.), and/or a model training module 118 for training the model based on natural language requests and desired image results for the requests. In addition, the device 100 can communicate with a model 128 (e.g., an AI or ML model), which can be via a network 122 for a remotely located model 128 or the model 128 can be stored in memory/memories 104, in some examples.

In an example, effect creation tool 110 can provide, via user interface (UI) module 112, one or more UIs (e.g., graphical UIs) that facilitate creating video applications, video features, etc. for executing using game engine 120. Game engine 120 can provide a platform for rendering video on display 108, or other display device, using the one or more processors 102 (e.g., a central processing unit (CPU) and/or a graphics processing unit (GPU)). For example, effect creation tool 110 can include a video creation studio application having features such as options for creating a canvas for the video, inserting textures, overlays, etc. into the video, a video preview window to preview a created video, and/or the like. In various examples, effect creation tool 110 can support operations that include obtaining or modifying an image of the video, and can support the operations in one or more UIs provided via user interface module 112. Aspects described herein relate to using models for performing one or more of the image-related operations, which can reduce complexity of using such features of the effect creation tool 110.

In an example, for one or more operations provided by the user interface module 112, once the option is selected or engaged by interaction from a user via a user interface, model querying module 114 can query a model 128 with certain input to retrieve one or more image results. For example, user interface module 112 can receive, from user interaction, a natural language request for an image or image operation. Model querying module 114 can provide at least a portion of the natural language request as input to the model 128. In an example, model querying module 114 may also add specific terms to the input to the model 128 to influence the output received from the model 128 (e.g., to influence a format or context of the output). The terms may be specific to a video effect or feature being requested (e.g., a facemask request) and/or may include additional options provided by the user interface module 112 and selected by user interaction in specifying the natural language request. For example, the user interface module 112 may receive the natural language request in a facemask applying function of the effect creation tool 110. In this example, model querying module 114 may add one or more of a "facemask" term to the input to model 128, a size of images to be considered for facemasks (e.g., resolution size or file size), a file type of images to be considered for facemasks, etc.

In an example, model querying module 114 can query the model 128 and can accordingly receive, from the model 128, one or more image results based on the input provided to the model 128. Image importing module 116, in an example, can import the received image result(s) into the effect creation tool 110, which may include storing the image result(s) to memory/memories 104, loading the image result(s) from the memory/memories 104 for display on a UI provided by user interface module 112, converting the image from a native file type, resolution, or format to a file type, resolution, or format supported by the effect creation tool 110, etc. In an example, user interface module 112 can provide the image result(s) as a selectable option for incorporating into a video application or feature being created using the effect creation tool 110.

In an example, model training module 118 can provide training data to the model 128 to tailor results received from subsequent queries to the model 128. For example, the training data can include an indication of image result parameters or formats to be received from the model 128 for certain types of input queries provided to the model 128. In another example, the training data may be based on feedback received from users (e.g., via a UI provided by user interface module 112) indicating whether results provided by the model 128 in response to a natural language request accurately represent the intent of the user's request.

FIG. 2 is a flowchart of an example of a method 200 for using a model for performing image operations in an effect creation tool, in accordance with aspects described herein. For example, method 200 can be performed by a device 100 executing an effect creation tool 110 and/or one or more components thereof for providing intuitive image operations based on natural language requests by using models.

In method 200, at action 202, a natural language string requesting an operation related to obtaining or modifying an image can be received via a UI provided for an effect creation tool. In an example, user interface module 112, e.g., in conjunction with processor(s) 102, memory/memories 104, operating system 106, effect creation tool 110, etc., can receive, via the UI provided for the effect creation tool, the natural language string requesting the operation related to obtaining or modifying the image. For example, the user interface module 112 can display, via display 108, various UIs the allow for user interaction with the UIs to select options for creating a video, game, video effect, etc., using the effect creation tool. For example, the UIs can include options or operations for obtaining an image as a texture for the video, obtaining a variation of an image for the video, editing the image for the video, obtaining an effect for overlaying on the video, such as a facemask for overlaying on a face in a video, etc. as part of one or more of these operations, user interface module 112 can provide, on a user interface, a mechanism, such as a text input box, for a user to enter a natural language request related to the operation.

For example, on a UI for obtaining an image, user interface module 112 can include a text box for requesting an image using natural language. For example, on a UI for obtaining a variation of an image, user interface module 112 can allow selection of an imported image and can include a text box for requesting the variation the imported image using natural language. For example, on a UI for editing an image, user interface module 112 can include a text box for a natural language request, such as requesting how to edit the image (e.g., "add" some feature to the image). For example, on a UI for obtaining a facemask, user interface module 112 can include a text box for a natural language request, such as requesting a type or description of the facemask using natural language.

In method 200, optionally at action 204, an input can be generated to include at least a portion of the natural language string and a context parameter associated with the operation. In an example, model querying module 114, e.g., in conjunction with processor(s) 102, memory/memories 104, operating system 106, effect creation tool 110, etc., can generate the input to include at least the portion of the natural language string and the context parameter associated with the operation. For example, for obtaining an image, model querying module 114 can include, with the natural language request, a context parameter indicating that an image result is desired, specifications of the image (which may be indicated on the UI), such as size (e.g., resolution or file size), file type, two-dimensional or three-dimensional, a number of generation steps for the query, a prompt strength indicator for the natural language string request, etc. For example, the context parameter can be added as another value in the natural language string (e.g., pre-pended or appended as an additional string in the natural language string).

For example, for obtaining a variation of an image, model querying module 114 can include, with the natural language request, a context parameter including the original image for which a variation is desired. For example, the context parameter can include a location of the original image (e.g., a universal resource locator (URL)), a description of the original image, a file of the original image, etc. In some examples, the context parameter may also include a string indicating that a variation of the original image is desired, one or more of the context parameters described above for obtaining an image, etc. In another example, for applying a facemask, model querying module 114 can include, with the natural language request, a context parameter indicating that the image is going to be used as a facemask (and thus results should have some relationship to being used a facemask, such as having been used for facemasks by other users/ applications, having properties that allow for overlay on a face, such as locations where eyes can be seen when the image is overlaid on a face, etc.).

In method 200, at action 206, an input including at least a portion of the natural language string can be provided to a model. In an example, model querying module 114, e.g., in conjunction with processor(s) 102, memory/memories 104, operating system 106, effect creation tool 110, etc., can provide, to the model (e.g., model 128) the input including at least the portion of the natural language string. For example, model querying module 114 can provide at least the portion of the natural language string as input to the model 128, where the input may or may not also include the context parameter described above. As described, the model 128 can be remotely located or stored on device 100 (e.g., in memory/memories 104). In one example, model querying module 114 can query multiple models based on the input. Providing the context parameters may assist the model 128 in providing a desired output or output format, as described above and further herein.

In method 200, at action 208, an image result output can be received from the model based on the input. In an example, model querying module 114, e.g., in conjunction with processor(s) 102, memory/memories 104, operating system 106, effect creation tool 110, etc., can receive, from the model (e.g., model 128), the image result output based on the input. For example, the image result output can be based on the natural language string and/or any added context parameters. In some examples, the context parameters may identify a desired set of output criteria, which the model 128 can use in providing the image result output. The image result output can include one or more images located by the model 128 based on the natural language string and/or context parameter(s). In one example, the image result output can include the image file(s), location(s) of the image file(s) (e.g., a URL for the image file(s)), etc. In an example, model querying module 114 can receive image results from multiple models (e.g., where multiple models are queried).

In method 200, at action 210, the image result can be imported as an asset in the effect creation tool. In an example, image importing module 116, e.g., in conjunction with processor(s) 102, memory/memories 104, operating system 106, effect creation tool 110, etc., can import the image result as an asset in the effect creation tool 110. In an example, image importing module 116 can import the image result for creating a video effect using the image result, such as overlaying the image result on a video. For example, image importing module 116 can import the image result as a display image by storing the display image in memory/ memories 104 accessible by the effect creation tool 110, displaying an option to select the display image as a select- able asset in the effect creation tool 110 (e.g., as a texture, feature, etc.) for incorporating into a video or effect being created, and/or the like. Where the display image is imported into the effect creation tool 110, user interface module 112 can display a UI having one or more selectable options for incorporating the image result into the video application or effect being created. In one example, image importing module 116 may modify the image result as part of import- ing into the effect creation tool 110, which may include modifying a size (e.g., resolution or file size) of the image, modifying a file type of the image, etc.

In another example, image importing module 116 can additionally or alternatively import the image result as a prefabrication of a facemask component that can be applied to the video or effect being created. For example, image importing module 116 can create the prefabrication in memory as an asset in the effect creation tool 110 that can be used (e.g., via user interaction) on the video or effect being created. In an example, image importing module 116 can create an empty prefabrication in memory, and then add a facemask component to the prefabrication, which can include information related to the face, such as material, component, or other parameters. In this example, image importing module 116 can import the image result to the facemask component so it can be applied to a face for the effect. In this regard, for example, the creation process can be automated so the user can search for the desired effect and select the effect for import/application, without having to find an image, create the facemask object, modify the image, manually import the image, store the asset, etc.

For example, for an image being obtained or a variation of an image being obtained, user interface module 112 can display an option to add the image as a texture in a video being created. For example, for a facemask image being obtained, user interface module 112 can display an option to add the facemask on a face (e.g., a detected human face) of a video being created, and/or can show the facemask applied on a face in a video preview window.

In an example, for image editing, in method 200, option- ally at action 212, a location on the image for modification to the image can be prompted for, via the UI. In an example, user interface module 112, e.g., in conjunction with proces- sor(s) 102, memory/memories 104, operating system 106, effect creation tool 110, etc., can prompt, via the UI, for the location on the image of the modification to the image. For example, user interface module 112 can allow for selection or indication of the location on the image for modification.

Based on the indicated location and the natural language string and/or context parameters, model querying module 114 can query the model 128 to obtain image results for modifying the image. For example, image importing module 116 can import the image results into the effect creation tool 110, and user interface module 112 can modify the image using the image result (e.g., placing the image result at the indicated location on the image or overlaying the image result at (or merging the image result with) the indicated location on the image, etc.). For example, the indicated location can relate to a point indicated on the user interface, a range of adjacent points in a selection area, where the selection area can be of substantially any shape (e.g., square, circle, rectangle, oval, triangle, user-generated shape, etc.), and/or the like.

In another example, image importing module 116 can import a single image result or can import various image results. In an example, the context parameter may indicate a number of results desired from the model 128. In one example, user interface module 112 can display the image results and allow user interaction to select a subset of the image results for importing into the effect creation tool 110. In another example, model querying module 114 can query multiple models 128 for the image results. In one example, user interface module 112 can display the image results per model, such that the UI can allow user interaction to select a model and the image results from the selected model can be displayed via the UI. In an example, various image results can be selected from one or more models for importing into the effect creation tool 110.

In method 200, optionally at action 214, an indication of multiple image results and/or multiple models can be dis- played. In an example, user interface module 112, e.g., in conjunction with processor(s) 102, memory/memories 104, operating system 106, effect creation tool 110, etc., can display the indication of the multiple image results and/or multiple models. For example, importing the image result can be based on selection of one or more of the multiple image results for importing. In another example, where multiple models are queried, user interface module 112 can display indications of the multiple models, and selection (e.g., via user interaction) of one of the models can cause user interface module 112 to display the image results associated with the selected model. In an example, import- ing the image result at action 210 can be based on selection of the image result, in the user interface, from the displayed image results associated with the selected model.

In method 200, optionally at action 216, training data can be provided to the model. In an example, model training module 118, e.g., in conjunction with processor(s) 102, memory/memories 104, operating system 106, effect cre- ation tool 110, etc., can provide training data to the model (e.g., model 128). For example, model training module 118 can provide feedback received from user interaction with a user interface regarding whether the image result(s) were relevant to the natural language string received via the user interface or not, a degree or rating of the image result(s) with respect to the natural language string, etc. In another example, model training module 118 can provide training data to the model that includes specifications of output parameters desired for certain image operations, etc., as described herein.

FIG. 3 is a block diagram that illustrates an example of interactions 300 with a model 128, in accordance with aspects described herein. For example, interactions 300 can include input interactions with the model 128 or output interactions with the model 128. For example, user interface module 112 can provide a UI with a user prompt 302 for creating an image. In the user prompt 302, a user can input a natural language string for creating an image, such as "jumping cat." Model querying module 114 can provide at least a portion of the natural language string to the model 128 for querying for an image based on the natural language string. In another example, a user interface module 112 can provide a UI indicating an image asset 304 already imported in the effect creation tool 110 and an option to create an image variation. Model querying module 114 can provide the image asset, or an indication of a location (e.g., URL) of the image asset, to the model 128 for querying for a variation of the image based on the original image asset.

In yet another example, user interface module 112 can provide a UI with options for editing or modifying an image, such as an option to mask image 306, an image asset 308, and/or a user prompt 310. The option to mask image 306 may include a prompt for a natural language string to describe a desired mask. In this example, model querying module 114 can provide at least a portion of the natural language string to the model 128, a context parameter indicating a mask to retrieve image results relevant to a mask, etc. for querying for an image. As described above, image asset 308 or user prompt 310 can be possible input interactions for the purposes of editing or modifying an image, such as to provide an original image for obtaining a variation for editing the image, to obtain an image for the editing process based on a natural language string, etc.

In an example, model 128 can output one or more images (e.g., generate image 312) based on the query, and the images can be imported to a UI panel 314 (e.g., provided by a user interface module 112 of an effect creation tool 110), as described herein. For example, the image results can be imported, and associated UIs can include options for applying the image results to a video being created (e.g., as textures, masks, etc.). In this regard, the effect creation tool 110 can natively support image creation and/or modification by using a model to obtain the images or modifications thereto. This can enable the user to create or modify images using a model without having to separately search for images or modifications, convert the images or modifications for use in the effect creation tool 110, manually import the images or modifications, etc.

In any case, the effect creation tool 110 can allow for creating a video effect by using a small number of interactive steps. For example, at user prompt 302 or 310, a natural language request can be input. After inputting the request, the effect creation tool 110 can automate searching the model 128 for a corresponding image result, and can return the image results for importing into the UI panel 314. In an example, this can include displaying the image results and allowing user interaction with one or more of the image results to import the image resources into the effect creation tool 110 and also to apply the image results as video effects. In another example, effect creation tool 110 can display a single option to perform the combined steps of importing and applying the image results as video effects.

Figure 4:
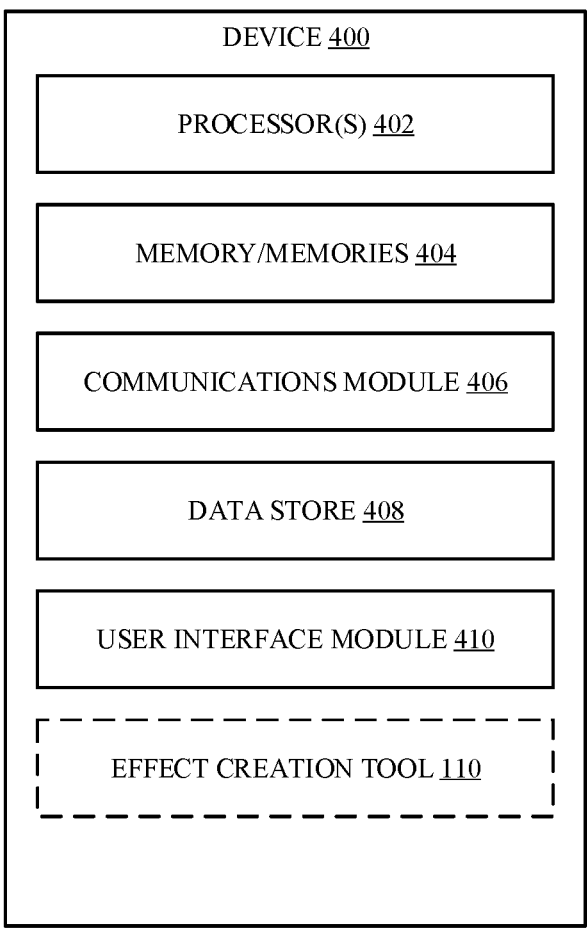
FIG. 4 is a schematic diagram of an example of a device for performing functions described herein.

FIG. 4 illustrates an example of device 400, similar to or the same as device 100 (FIG. 1), including additional optional component details as those shown in FIG. 1. In one implementation, device 400 may include processor(s) 402, which may be similar to processor(s) 102 for carrying out processing functions associated with one or more of components and functions described herein. Processor(s) 402 can include a single or multiple set of processors or multi-core processors. Moreover, processor(s) 402 can be implemented as an integrated processing system and/or a distributed processing system.

Device 400 may further include memory/memories 404, which may be similar to memory/memories 104 such as for storing local versions of applications being executed by processor(s) 402, such as effect creation tool 110, related modules, instructions, parameters, etc. Memory/memories 404 can include a type of memory usable by a computer, such as random access memory (RAM), read only memory (ROM), tapes, magnetic discs, optical discs, volatile memory, non-volatile memory, and any combination thereof.

Further, device 400 may include a communications module 406 that provides for establishing and maintaining communications with one or more other devices, parties, entities, etc., utilizing hardware, software, and services as described herein. Communications module 406 may carry communications between modules on device 400, as well as between device 400 and external devices, such as devices located across a communications network and/or devices serially or locally connected to device 400. For example, communications module 406 may include one or more buses, and may further include transmit chain modules and receive chain modules associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with implementations described herein. For example, data store 408 may be or may include a data repository for applications and/or related parameters (e.g., effect creation tool 110, related modules, instructions, parameters, etc.) being executed by, or not currently being executed by, processor(s) 402. In addition, data store 408 may be a data repository for effect creation tool 110, related modules, instructions, parameters, etc., and/or one or more other modules of the device 400.

Device 400 may include a user interface module 410 operable to receive inputs from a user of device 400 and further operable to generate outputs for presentation to the user. User interface module 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 410 may include one or more output devices, including but not limited to a display, a speaker, a haptic feedback mechanism, a printer, any other mechanism capable of presenting an output to a user, or any combination thereof. User interface module 410 may include or may communicate with user interface module 112 to allow input via user interface module 112, or receive output via user interface module 112 for displaying, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for image operations in an effect creation tool, comprising:

receiving, via a user interface provided for the effect creation tool, a natural language string requesting an operation related to obtaining or modifying an image;

providing, to multiple models, an input including at least a portion of the natural language string;

receiving, from the multiple models, multiple image results output based on the input;

displaying an indication of the multiple models, and, based on selection of one of the multiple models, a portion of the multiple image results corresponding to the one of the multiple models; and importing an image result of the multiple image results as an asset in the effect creation tool.

2. The computer-implemented method of claim 1, further comprising generating the input to include the natural language string and a context parameter associated with the operation.

3. The computer-implemented method of claim 1, wherein the operation includes obtaining the image, wherein the image result includes a display image, and wherein importing the image result includes creating the asset for the display image in the effect creation tool.

4. The computer-implemented method of claim 1, wherein the operation includes obtaining the image as a variation of an original image, wherein the image result includes a display image, and wherein importing the image result includes creating the asset for the display image in the effect creation tool.

5. The computer-implemented method of claim 1, further comprising prompting, via the user interface, for a location on the image of a modification to the image, wherein the operation includes the modification to the image, and wherein importing the image result includes applying the image result as the modification to the image.

6. The computer-implemented method of claim 1, wherein the operation includes applying the image to an object as a mask, wherein the natural language string indicates the image to be applied as the mask, and wherein importing the image result includes applying the image result as the mask over the image.

7. The computer-implemented method of claim 1, wherein importing the image result as the asset in the effect creation tool is based on selection, via the user interface, of the image result from the multiple image results.

8. An apparatus for image operations in an effect creation tool, the apparatus comprising one or more processors and one or more non-transitory memories with instructions thereon, wherein the instructions upon execution by the one or more processors, cause the one or more processors to:

receive, via a user interface provided for the effect creation tool, a natural language string requesting an operation related to obtaining or modifying an image;

provide, to multiple models, an input including at least a portion of the natural language string;

receive, from the multiple models, multiple image results output based on the input;

display an indication of the multiple models, and, based on selection of one of the multiple models, a portion of the multiple image results corresponding to the one of the multiple models; and import an image result of the multiple image results as an asset in the effect creation tool.

9. The apparatus of claim 8, wherein the instructions upon execution by the one or more processors, cause the one or more processors to generate the input to include the natural language string and a context parameter associated with the operation.

10. The apparatus of claim 8, wherein the operation includes obtaining the image, wherein the image result includes a display image, and wherein the instructions upon execution by the one or more processors, cause the one or more processors to import the image result including creating the asset for the display image in the effect creation tool.

11. The apparatus of claim 8, wherein the operation includes obtaining the image as a variation of an original image, wherein the image result includes a display image, and wherein the instructions upon execution by the one or more processors, cause the one or more processors to import the image result including creating the asset for the display image in the effect creation tool.

12. The apparatus of claim 8, wherein the instructions upon execution by the one or more processors, cause the one or more processors to prompt, via the user interface, for a location on the image of a modification to the image, wherein the operation includes the modification to the image, and wherein the instructions upon execution by the one or more processors, cause the one or more processors to import the image result including applying the image result as the modification to the image.

13. The apparatus of claim 8, wherein the operation includes applying the image to an object as a mask, wherein the natural language string indicates the image to be applied as the mask, and wherein the instructions upon execution by the one or more processors, cause the one or more processors to import the image result including applying the image result as the mask over the image.

14. The apparatus of claim 8, wherein the instructions upon execution by the one or more processors, cause the one or more processors to import the image result as the asset in the effect creation tool is based on selection, via the user interface, of the image result from the multiple image results.

15. One or more non-transitory computer-readable storage media storing instructions that when executed by one or more processors cause the one or more processors to execute a method for image operations in an effect creation tool, wherein the method comprises:

receiving, via a user interface provided for the effect creation tool, a natural language string requesting an operation related to obtaining or modifying an image;

providing, to multiple models, an input including at least a portion of the natural language string;

receiving, from the multiple models, multiple image results output based on the input;

displaying an indication of the multiple models, and, based on selection of one of the multiple models, a portion of the multiple image results corresponding to the one of the multiple models; and importing an image result of the multiple image results as an asset in the effect creation tool.

16. The one or more non-transitory computer-readable storage media of claim 15, the method further comprising generating the input to include the natural language string and a context parameter associated with the operation.

17. The one or more non-transitory computer-readable storage media of claim 15, wherein the operation includes obtaining the image, wherein the image result includes a display image, and wherein importing the image result includes creating the asset for the display image in the effect creation tool.

18. The one or more non-transitory computer-readable storage media of claim 15, wherein the operation includes obtaining the image as a variation of an original image, wherein the image result includes a display image, and wherein importing the image result includes creating the asset for the display image in the effect creation tool.

19. The one or more non-transitory computer-readable storage media of claim 15, further comprising prompting, via the user interface, for a location on the image of a modification to the image, wherein the operation includes the modification to the image, and wherein importing the image result includes applying the image result as the modification to the image.

20. The one or more non-transitory computer-readable storage media of claim 15, wherein the operation includes applying the image to an object as a mask, wherein the natural language string indicates the image to be applied as the mask, and wherein importing the image result includes applying the image result as the mask over the image.

\* \* \* \* \*